May 30, 1972 — T. CARRIGAN — 3,666,369
HEADLIGHT TESTER
Filed March 18, 1970 — 4 Sheets-Sheet 1
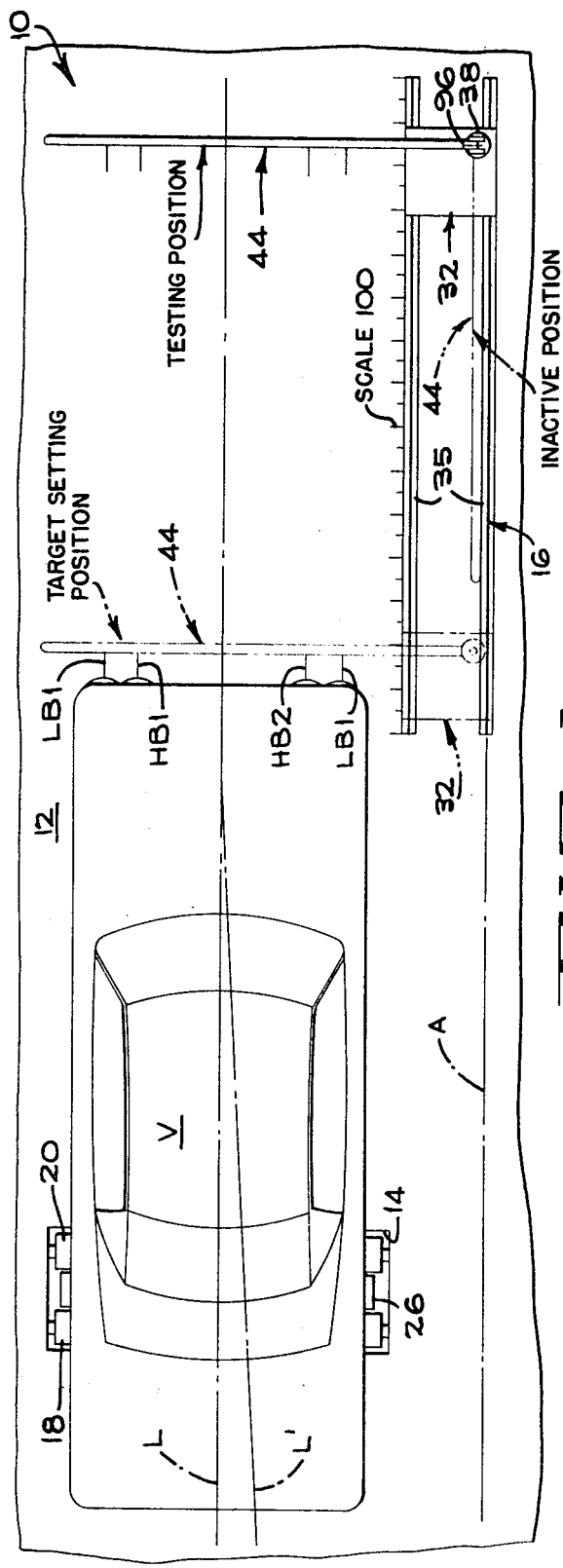
FIG_1
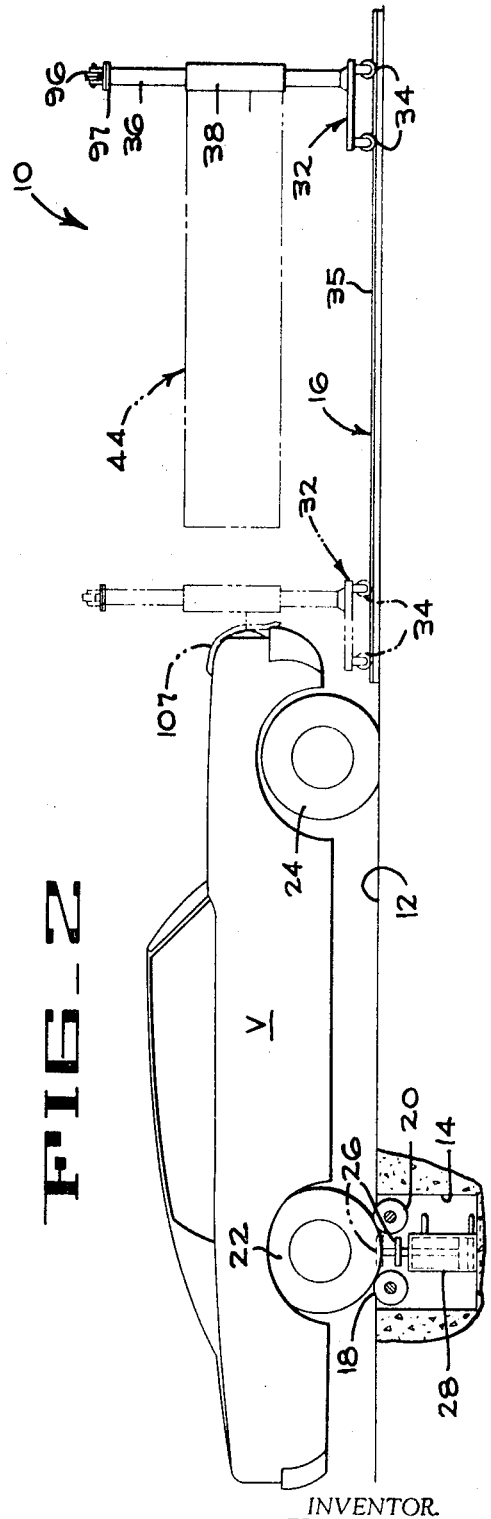
FIG_2
INVENTOR.
TRACY CARRIGAN
BY
C. E. Tripp — ATTY.
A. J. Moore — AGENT

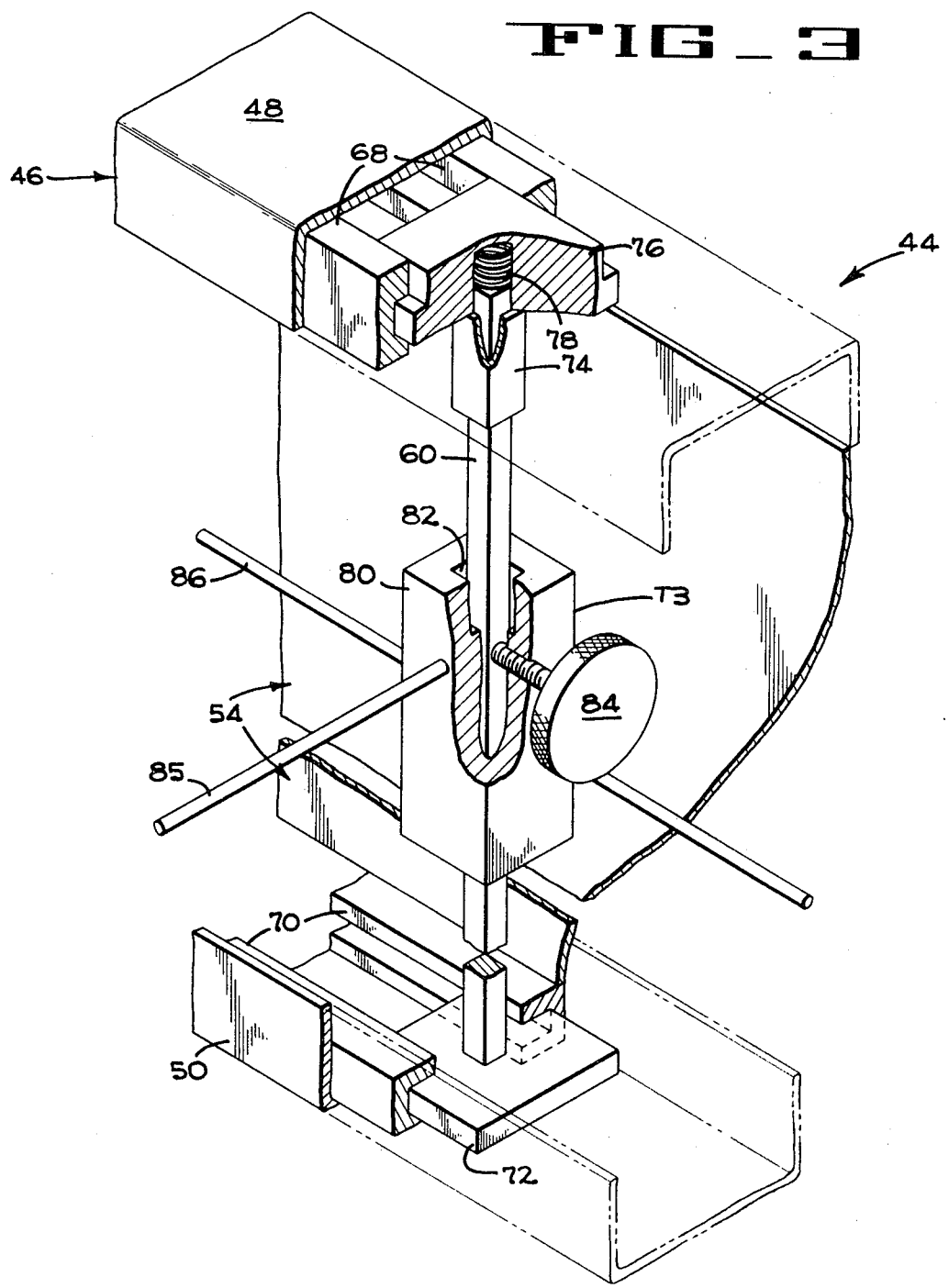

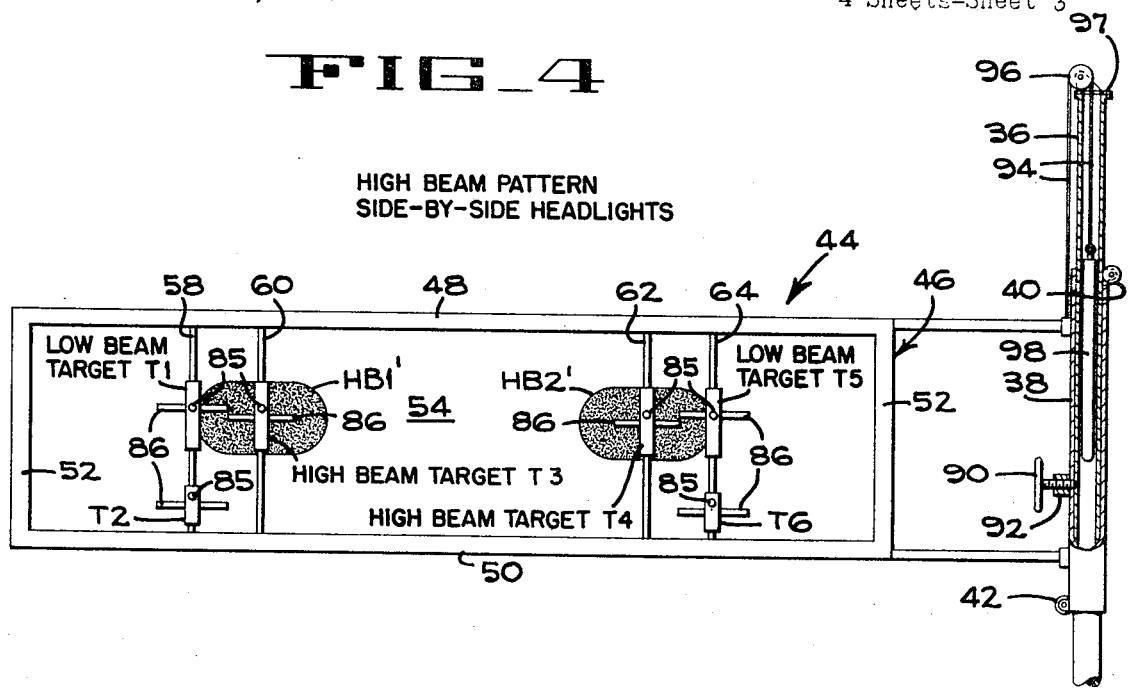
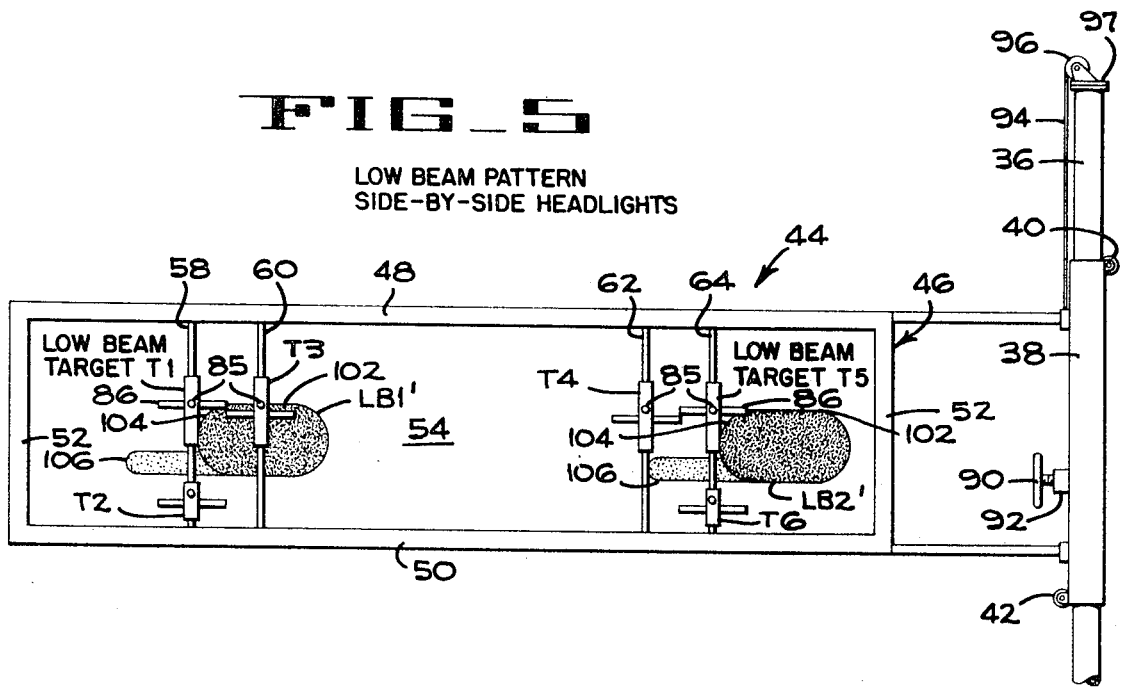

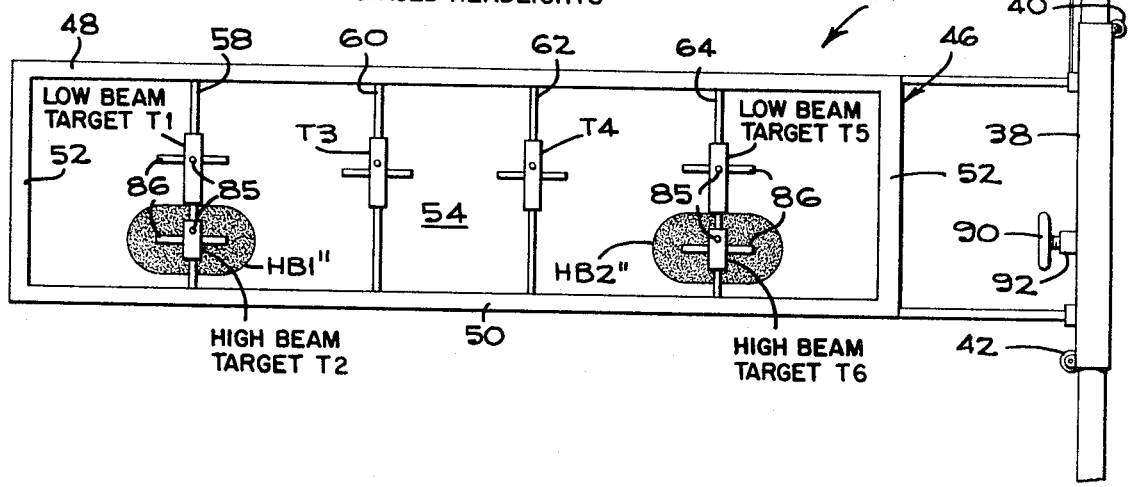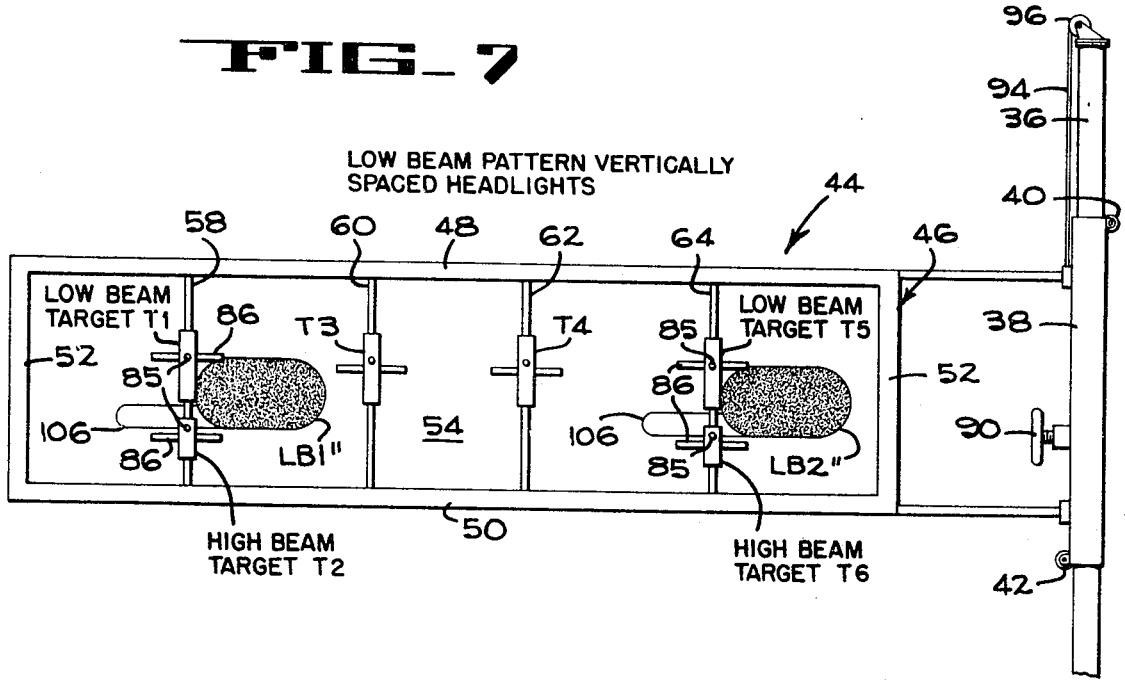

United States Patent Office 3,666,369
Patented May 30, 1972

3,666,369
HEADLIGHT TESTER
Tracy Carrigan, Lansing, Mich., assignor to
FMC Corporation, San Jose, Calif.
Filed Mar. 18, 1970, Ser. No. 20,687
Int. Cl. G01j 1/00
U.S. Cl. 356—121                                9 Claims

ABSTRACT OF THE DISCLOSURE

A headlight testing method and apparatus for detecting the direction of the beam of light from each vehicle headlight relative to the longitudinal axis of a vehicle and relative to the height of each light from a horizontal vehicle supporting plane. A target screen is mounted for vertical adjustment and horizontal pivotal adjustment on a carriage which is movable on a track between a target setting position adjacent the headlights and a testing position spaced from the headlights. A pair of rollers journaled about axes normal to the track support are rotated by the drive wheels of the vehicle for aligning the longitudinal axis of the vehicle into a position parallel with the track. The screen includes three vertically and horizontally adjustable targets associated with each headlight group of a vehicle to accommodate vehicles with a single headlight, double side-by-side headlights, and double vertically spaced headlights in each group. Each target has a pointer which is adjusted to contact the center of the associated headlight when the target is in its target setting position and a horizontal reference bar for referencing the position of the high intensity light beam when the screen is in the testing position.

BACKGROUND OF THE INVENTION

Field of the invention

This invention relates to a method and apparatus for checking the proper orientation of light beams from vehicle headlights and for positioning the longitudinal axis of a vehicle parallel with a reference plane.

Description of the prior art

Many different types of headlight testing apparatus has been developed for aiming light beams of the headlights of vehicles in directions which comply with government standards. One problem with many of the prior art devices was the difficulty of accurately positioning the target screen in a plane perpendicular to the longitudinal axis of the vehicle, or more particularly, in a plane perpendicular to the straight line path of travel of the vehicle.

Another problem in this art is that the headlights on vehicles vary considerably in height, horizontal and vertical spacing, and in the number and arrangement of headlights in the right hand and left hand headlight groups or sets on the front of the vehicles.

SUMMARY OF THE INVENTION

The headlight tester of the present invention includes a horizontal floor having a pair of rollers freely journaled in a well in the floor about axes that are normal to a pair of guide tracks. A vehicle is driven onto the floor so that its drive wheels, usually the rear wheels, are supported on the rollers. The forward motion of the vehicle is then stopped and the drive wheels are rotated by power from the vehicle engine causing the drive wheels and the supported portion of the vehicle to move transversely on the rollers until the vehicle is in the position which it would assume when driving along a straight path parallel to the track even though the vehicle body to which the headlights are attached may be canted relative to this straight path of travel. Hereinafter, the straight line path of travel of a vehicle will be referred to as the vehicle's longitudinal axis even though it is realized that improper assembly of the vehicle body upon the chassis may result in the body axis being angled several degrees relative to the vehicle axis.

A carriage is movable along the track and carries a screen which is adjustable between a target setting position and a testing position extending substantially perpendicular to the track, and a position parallel to the track for allowing the vehicle to be driven forward past the tester. The screen is also vertically adjustable on the carriage, and carries three targets for each group of headlights. The targets are adjustably mounted on vertical rods, and the vertical rods are adjustably horizontally of the screen.

BRIEF DESCRIPTION OF THE DRAWINGS

FIG. 1 is a diagrammatic plan of the headlight tester of the present invention with the tester screen and carriage being shown in full lines in their testing position and in phantom lines in their target setting positions, said screen also being shown in phantom lines in its retracted inoperative position.

FIG. 2 is a diagrammatic side elevation of the apparatus of FIG. 1.

FIG. 3 is an enlarged diagrammatic perspective with parts cut away and other parts shown in phantom illustrating a fragment of the screen and its frame, and showing one of the targets with the structure for adjusting the same.

FIG. 4 is an operational view of the screen and targets illustrating the desired setting of the position of a high intensity zone of the high beam lights on a vehicle having two pairs of horizontally spaced headlights.

FIG. 5 is an operational view for testing the low beam headlights of a vehicle having two pairs of horizontally spaced headlights.

FIG. 6 is an operational view similar to FIG. 4 but illustrating the desired setting of the positions of the high intensity zones of the high beam lights on vehicles having two pairs of lights which are vertically spaced.

FIG. 7 is an operational view for testing the low beam headlights of an automobile having two pairs of vertically spaced headlights.

DESCRIPTION OF THE PREFERRED EMBODIMENT

The headlight tester 10 (FIGS. 1 and 2) of the present invention includes a level floor 12, such as a concrete floor, having a well 14 therein which extends normal to a vertical reference plane A that is parallel to a track 16. The track may be extended in the event a front wheel drive vehicle is to be tested. A pair of spaced parallel rollers 18 and 20 are journaled for free rotation in the well and have their axes of rotation normal to the reference plane A. As illustrated in FIG. 2, the rollers 18 and 20 are recessed in the well 14 so that a vehicle V having the usual components including engine driven rear wheels 22 and steerable front wheels 24 may be driven into the tester 10 with its longitudinal axis L substantially parallel to the reference plane A. The vehicle is stopped with its driven wheels 22 supported on the rollers 18 and 20. The wheels 22 are then driven by power from the vehicle's engine while the vehicle is held from longitudinal movement thus causing the rear end of the vehicle to shift laterally until the longitudinal axis L of the vehicle V becomes parallel with the reference plane A. If, for example, the vehicle is initially positioned on the rollers 18 and 20 with its longitudinal axis L' not parallel to the plane A, rotation of the rear wheels 22 while holding the vehicle from forward movement will cause the rear end of the vehicle to shift toward its left side until its longitudinal axis becomes parallel to the line A.

After the longitudinal axis L of the vehicle V has been moved into a position parallel to the plane A, the vehicle's engine is stopped and the rear, or driving wheels 22 are raised to the level of the floor 12 by a support plate 26 disposed between the rollers 18 and 20 and moved upwardly to the level of the floor 12 by a hydraulic or pneumatic jack 28. The vehicle V is in this way supported on a horizontal plane with its longitudinal axis parallel to the track 16.

With the vehicle V is so supported, testing of the headlights may commence. The headlight tester 10 includes a carriage 32 (FIGS. 1 and 2) which is provided with wheels 34 that ride along two parallel rails 35 of the track 16. A vertically extending tubular post 36 of circular cross-section is rigidly secured to one corner of the carriage 32 and has a tubular sleeve 38 slidably received thereon for vertical movement as well as pivotal movement. An upper roller 40 (FIG. 4) and lower roller 42 are journaled on ears projecting outwardly of the sleeve 38 and bear against diametrically opposed surfaces of the post 36 to reduce friction during vertical adjustment of the sleeve 38 and testing screen 44 secured thereto.

The screen 44 includes a light weight frame 46 (FIGS. 3 and 4) which includes an elongated horizontal upper member 48, an elongated horizontal lower member 50 parallel with the upper member, and two vertical members 52. A screen 54 is secured to the rear portion of the members 48, 50 and 52 and serves as a base against which the headlight beams are directed to indicate the high intensity zone of each headlight beam.

As illustrated in FIG. 4, six targets T1, T2, T3, T4, T5 and T6 are supported by the screen frame 46 into groups with the targets T1, T2 and T3 being in the left hand group and targets T4, T5 and T6 being in the right hand group. The targets T1 and T2 are mounted for vertical adjustment on a single vertical bar 58, the target T3 is mounted for vertical adjustment on a bar 60, the target T4 is mounted for vertical adjustment on a bar 62, and the targets T5 and T6 are mounted for vertical adjustment on a bar 64.

The bars 58, 60, 62 and 64 are all of rectangular cross section and are all horizontally adjustable in the screen frame 46 by structure similar to that disclosed in FIG. 3 which is used for adjusting the bar 60 horizontally. As shown in FIG. 3, pairs of spaced U-shaped guide tracks 68 and 70 are secured to the upper and lower frame members 48 and 50, respectively. A plate 72 secured on the lower end of the rod 60 is slidably received in the lower tracks 70. The upper end of the rod 60 is slidably received in a rectangular sleeve 74 that is secured to a slide block 76 slidably received in the upper guide tracks 68. A spring 78 is disposed between a relieved portion of the slide block 76 and the upper end of the rod 60 and normally urges the rod downwardly with sufficient force to frictionally hold the rods 60 in adjusted position.

The target T3 (FIG. 3) includes a slide block or main body 80 having a rectangular opening therein for slidably receiving the bar 60. The upper portion of the opening is counterbored at 82 to receive the rectangular sleeve 74. The target body 80 is locked in adjusted position by tightening a screw threaded friction lock 84 against the bar 60 as clearly shown in FIG. 3.

Since all of the other targets are constructed in substantially the same manner as the target T3, the description of the target T3 will suffice for all. It will be noted, however, that each target includes a pointer 85 and a horizontal reference bar 86 that are mounted at different locations (FIG. 4) on their associated target bodies which bodies correspond to the block 80 (FIG. 3). As will be described in more detail hereinafter, the pointer 85 of each target is adjusted, when the screen is in the target setting position, so that the pointer will contact the center of the particular headlight being tested. As shown in FIG. 5, the targets T1 and T5 are provided for testing the low beam lights LB1 and LB2 (FIG. 1) on the left hand and right hand side, respectively, of the vehicle V. Each target T1 and T5 has its pointer 85 and horizontal reference bar 86 lying in a common plane. The horizontal reference bars 86 of the other targets, which targets are used to test the high beam lights such as lights HB1 and HB2 (FIG. 1), are disposed one inch below the plane of the associated pointers 85 for reasons to be described hereinafter.

In addition to the above described horizontal and vertical adjustments of the targets, the entire screen 44 is mounted for vertical adjustment and for pivotal adjustment about the axis of the vertical post 36. As best shown in FIG. 4, a hand screw or friction lock 90 is threaded into a hub 92 on the sleeve 38 and when tightened bears against the post 36 to lock the sleeve 38 in adjusted position. In order to balance the weight of the screen 44 and parts associated therewith, a cable 94 is trained over a pulley 96 journaled on a swivel 97 connected to the upper end of the post 36 and has one end connected to the screen frame 46 and the other end connected to a counterweight 98 positioned within the post 36.

In operation, after the vehicle V (FIGS. 1 and 2) has been positioned as above described with its longitudinal axis L parallel to the plane A and with its four wheels 22 and 24 supported on a common horizontal plane, the carriage 32 and screen 44 are moved to the target setting position shown in phantom lines in FIG. 1. If the vehicle being tested has two pair of side-by-side headlights as indicated, only targets T1, T3, T4 and T5 (FIG. 4) are used. The pointers 85 (FIG. 1) of targets T1, T3, T4 and T5 are adjusted so as to contact the center of headlights LB1, HB1, HB2, LB2, respectively, and are locked in adjusted position by the associated friction locks 84 (FIG. 3) and by the associated slide blocks 76. The screen 44 is then locked in its transverse position perpendicular or substantially perpendicular to the longitudinal axis L of the vehicle by the friction lock 90.

The operator then visually checks a scale 100 (FIG. 1) and moves the screen 44 and carriage 32 along the track 16 from the target setting position to the testing position which is 12½ feet away from the target setting position. The operator then turns the low beam lights LB1 and LB2 on and observes the location of the high intensity zone of beam pattern from these lights on the screen 44 relative to targets T1 and T5, respectively.

Government standards which are observed in most states require that each low beam headlight be aimed downwardly and to the right of a straight forward beam axis, i.e., the axis of the center of the beam of light from each low beam headlight should not be aligned with the associated pointer 85 which represents the straight forward position but should be aimed a specific amount downwardly and to the right of the associated pointer. The desired position of the high intensity zones of the beam patterns for the low beam lights LB1 and LB2 are illustrated as zones LB1' and LB2', respectively, in FIG. 5. It will be noted that these zones have their upper edges 102 lying in the horizontal plane of the center of the associated low beam headlights, and have their left edges 104 spaced one inch to the right of the associated pointer 85, i.e., one inch to the right of a vertical plane that is parallel to the longitudinal axis L of the vehicle V and passes through the center of the low beam headlight to be tested. For ease in determining the proper position of the upper edge 102 and left edge 104 of the high intensity zone for each low beam headlight, the horizontal reference bars 86 of the low beam targets T1 and T5 lie in the same horizontal plane as the associated pointers 85, and the width of the target body or slide block 80 extends one inch outwardly in both directions from a vertical plane passing through the associated pointer 85. Thus, each low beam headlight is adjusted so that the upper edge 102 of its low beam high intensity zone LB1' or LB2' lies in the plane of the horizontal reference bar 86, and so that the left edge 104 of the light beam lies in the same vertical plane as the right edge of the associated target body 80. A zone of stray light 106 projects to the left of each low beam high intensity zone LB1' and LB2' but is not used for referencing the proper position of the low beams.

After the low beam headlights have been tested as above indicated, the high beam lights are turned on and the low beam lights are covered with any suitable covering such as a cloth 107 (FIG. 2). The government standards require that the high intensity zones HB1' and HB2' (FIG. 4) of the light beams from the high beam headlights HB1 and HB2 (FIG. 1), respectively, be located at predetermined points relative to their targets T3 and T4, respectively. These standards require that the center line of each high beam be parallel to a vertical plane passing through the longitudinal axis of the vehicle and that the center line intersects the screen 44 one inch below the horizontal plane of the high beam light being tested when the screen is spaced 12½ feet from the headlights. Thus, the operator merely adjusts the high beam lights HB1 and HB2 until the high intensity zones of the beam patterns HB1' and HB2' are centered horizontally on the associated pointer and are centered vertically on the associated horizontal reference bars 86, which bars are spaced one inch below the associated pointers 85.

Upon completion of the headlight testing operation which includes locking the headlights in adjusted position, the operator may loosen the friction lock 90 (FIG. 4) and pivot the screen 44 to its inactive position parallel to the track 16 (FIG. 1) so that the vehicle V may be driven forward out of the tester.

If a vehicle is to be tested having its two groups of headlights oriented so that a low beam headlight is disposed directly above a high beam headlight, the targets T3 and T4 (FIGS. 6 and 7) are not used. The low beam headlights are tested in a manner identical to that described above. In this regard, the pointers 85 on targets T1 and T5 are readjusted to contact the centers of the low beam headlights after the screen has been moved to its target setting position illustrated in FIG. 1. The targets T2 and T6 are then adjusted so that their pointers 85 are contacting the centers of the associated high beam lights. The targets T1, T2, T5 and T6, and the screen are then locked in place and the carriage 32 and screen 44 are moved 12½ feet away from the headlights to the testing position. The high intensity zone of beam pattern of the low beam lights LB1'' and LB2'' (FIG. 7) are then oriented with the associated markers T1 and T5 as above described, and the high intensity zones of beam pattern HB1'' and HB2'' from the high beam headlights are oriented in relation to the targets T2 and T6 rather than in relation to the targets T3 and T4 as above described.

If a vehicle having a pair of single, rather than dual, headlights is to be tested, only the low beams in each headlight is tested since the low beam and high beam filaments of each headlight are included in the same glass housing. Thus, only the targets T1 and T5 are used, and the testing procedure is the same as that described above for the low beam headlights LB1 and LB2 (FIG. 1).

From the above description it is apparent that the headlight tester of the present invention includes a pair of elongated rollers which engage the drive wheels of a vehicle and in response to driving these wheels while holding the vehicle from longitudinal movement will cause the vehicle body to shift transversely until its longitudinal axis lies in a plane perpendicular to the axis of the rollers. The tester also includes a screen which is movable between an inactive position parallel to the longitudinal axis of the vehicle and a position normal to the longitudinal axis of the vehicle. Additionally, the screen is movable between a target setting position at which time targets, which are adjustable to accommodate vehicles having different arrangements of headlights, are adjusted to locate the physical center of each headlight. These reference targets are then moved away from the headlight and each target serves as a reference point so that the high intensity zone of the beam pattern from its associated headlight may be properly oriented.

Although the best mode contemplated for carrying out the present invention has been herein shown and described it will be apparent that modification and variation may be made without departing from what is regarded to be the subject matter of the invention.

What I claim is:

1. In a headlight testing apparatus for testing the headlights of a vehicle supported on drive wheels and other wheels and having a longitudinal axis, the combination of means defining a horizontal floor, a pair of spaced rollers mounted for rotation about horizontal axes parallel to each other and positioned to receive the drive wheels of the vehicle when the other wheels are supported on said floor, means defining a vertical reference plane normal to the axes of said rollers, means for driving the drive wheels and rollers for causing the drive wheels to shift transversely of said reference plane for moving the longitudinal axis of the vehicle into a position parallel with said reference plane, said means which define said reference plane being a track supported on said horizontal floor, a carriage movable along said track between a target setting position and a testing position, a screen carried by said carriage and extending substantially perpendicular to said reference plane for intercepting the light beams from the vehicles headlights, a plurality of targets carried by said screen and adjustable relative to each other, said screen being movable to said target setting position wherein the center of each headlight is contacted by one of the targets, and means for holding each target in adjusted position relative to the screen with each target functioning to reference the desired position of the associated light beam when the screen is in its testing position.

2. A headlight testing apparatus for testing the headlights of a power driven vehicle supported on drive wheels and other wheels and having a longitudinal axis comprising means defining a horizontal floor for supporting the vehicle in its normal horizontal driving attitude, an elongated horizontal track defining a vertical reference plane perpendicular to said floor, vehicle aligning means for aligning the longitudinal axis of said vehicle with said reference plane, a carriage supported by said track and movable between a target setting position and a testing position, a screen adjustably mounted on said carriage and extending substantially transversely of said reference plane, a plurality of targets adjustably mounted on said screen, means defining a reference pointer carried by each target, means for adjusting and locking certain ones of the targets so that the associated pointers will contact the centers of associated ones of said headlights, and means for locking said screen in a transverse plane substantially normal to said reference plane.

3. A headlight testing apparatus according to claim 2 wherein said transverse plane of the screen is parallel to a vertical plane passing through the points of contact of the pointers with said headlights so that the axis of the light beam of each headlight can be detected by the beam pattern cast upon the screen when the screen is in the testing position and can be adjusted to its correct direction by referencing the beam pattern to the associated target.

4. An apparatus according to claim 2 wherein said track is secured to the horizontal floor.

5. An apparatus according to claim 2 wherein said screen is adjustable vertically on said carriage for positioning the screen at different elevations for accommodating vehicles having headlights at different elevations above the floor.

6. An apparatus according to claim 2 wherein said screen is adjustable between said transverse position and a position parallel to said reference plane for permitting the screen to be pivoted out of the path of movement of the vehicle so that the vehicle can be driven forward out of the tester after the headlights have been adjusted.

7. An apparatus according to claim 2 wherein the testing position of the screen is 12½ feet from the target setting position and wherein each target associated with a low beam headlight has a horizontal reference bar disposed in the same common plane as the pointer of the associated target, and wherein the high intensity zone of beam pattern from the associated low beam headlight is adjusted so that the upper edge of the pattern is coincident with the horizontal reference bar and so that the left edge of the pattern is one inch to the right of the vertical plane passing through the associated pointer.

8. An apparatus according to claim 2 wherein the testing position of the screen is 12½ feet from the target setting position and wherein each target associated with a high beam headlight has a horizontal reference bar disposed in a horizontal plane one inch below the pointer of said associated high beam target, and wherein the high intensity zone of beam pattern from the associated high beam headlight is adjusted so that it is centered vertically about a vertical plane passing through the pointer and is centered horizontally about a horizontal plane passing through the reference bar.

9. The method of testing the headlights and moving the longitudinal axis of a vehicle supported on drive wheels and other wheels parallel to a vertical reference plane, wherein the vehicle includes headlights, and a screen and is provided with a plurality of adjustable targets for testing the headlight beams, comprising the steps of providing drive wheel supporting surfaces mounted for rotation about parallel spaced horizontal axes disposed normal to the reference plane, moving the vehicle to a position wherein the drive wheels are supported on the rotatable supporting surfaces, supporting the other vehicle wheels on a substantial horizontal plane at substantially the same elevation as the elevation of the drive wheels, rotating the drive wheels upon their rotatable supporting surfaces for transversely shifting the longitudinal axis of the vehicle into a position parallel to the vertical reference plane, moving the headlight testing screen along a path parallel to said vertical reference plane between a target setting position adjacent the headlights of the vehicle and a headlight beam testing position disposed from the vehicle, orienting a reference point on an associated one of the targets with the center of the adjacent headlight when the screen is in its target setting position, moving the screen and targets to the testing position, holding each target in adjusted position with each target functioning to reference the desired position of the associated light beam when the screen is in its testing position, and upon completion of the headlight testing operation elevating the drive wheels for spacing the drive wheels from their rotatable supporting surfaces.

References Cited

UNITED STATES PATENTS

| | | | |
|---|---|---|---|
| 2,583,201 | 1/1952 | Bennett | 73—117 |
| 678,041 | 7/1901 | Sanderson | 33—74 B |
| 3,077,139 | 2/1963 | Todd et al. | 356—121 |
| 3,533,699 | 10/1970 | Hopkins et al. | 356—121 |
| 3,532,433 | 10/1970 | Hopkins et al. | 356—121 |
| 2,161,886 | 6/1939 | Weaver | 356—121 |
| 2,977,843 | 4/1961 | Graeber et al. | 356—121 |

FOREIGN PATENTS

| | | | |
|---|---|---|---|
| 17,089 | 1905 | England | 33—46 AT |

RONALD L. WIBERT, Primary Examiner

J. ROTHENBERG, Assistant Examiner

U.S. Cl. X.R.

33—46 H; 356—154